Figure 1:
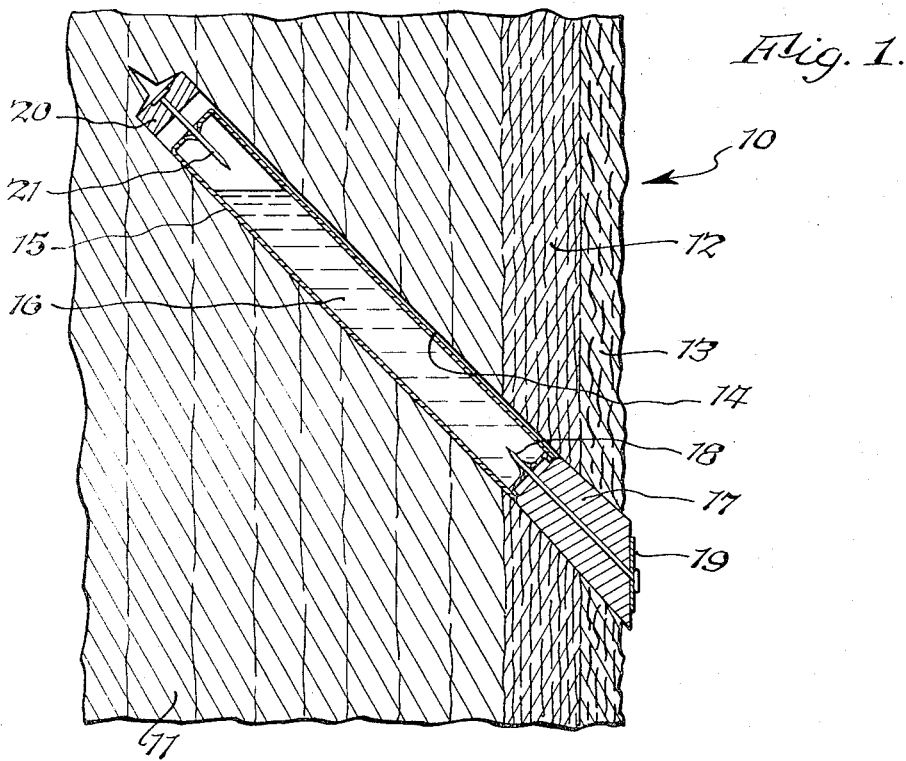

INVENTOR.
DuVal Cravens
BY
Christel & Bean
ATTORNEYS.

United States Patent Office 3,367,065
Patented Feb. 6, 1968

3,367,065
TREE TREATMENT METHOD
Du Val Cravens, Buffalo, N.Y., assignor to Osmose Wood Preserving Co. of America, Inc., Buffalo, N.Y.
Filed Aug. 8, 1966, Ser. No. 570,940
8 Claims. (Cl. 47—57.5)

The present invention relates to a method of treating trees and more particularly to a method of introducing a fluid into the circulatory system of a tree.

The care of trees includes proper feeding and treatment of both healthy and diseased trees. Nutrient fluids can be introduced into the circulatory system of a tree for feeding purposes. Tree ailments, such as Dutch elm disease, oak wilt, chestnut blight or the like may be prevented or cured by introducing fungicides or other chemical medicaments into the circulatory system of vulnerable or diseased trees. In either case, if the trees are to effectively assimilate the fluids they must be fed or dripped into the circulatory system of the tree over a period of time. Certain known fluid injection apparatus include a container fixed externally to a tree and carrying fluid which drips from the container at a controlled rate directly or via tubes into openings bored into the side of the tree. Other apparatus, including paints, bandages or other types of drip devices, also are mounted externally of the tree.

Most medicaments utilized are toxic to both humans and animals, and accordingly present a hazard to the public when left unattended in such externally mounted apparatus. The apparatus, by its very presence, invites tampering, is often easily dislodged from its mounting, and, in the case of a container, can be broken into and its contents dissipated. The unattended, continuous application of fluid to trees over an extended period of time is often interrupted by such tampering and, apart from possible loss of the tree, the danger of spilling or otherwise contaminating humans and animals in the case of toxic medicaments is always present.

Accordingly, it is a primary object of the present invention to provide a method of continuously applying a fluid to a tree in an adequate quantity over a period of time in which the applying apparatus is substantially tamper-proof.

It is also an object of the present invention to provide a method of continuously injecting a fluid into a tree wherein the fluid is not exposed, or in position to contaminate the surrounding environment during its introduction into the circulation system of the tree.

It is an additional object of the present invention to provide a method of injecting a fluid into a tree which is safe, easily applied to the tree and which gives little or substantially no indication to a casual observer that the tree is undergoing treatment.

It is another object of the present invention to provide a method of injecting fluid into a tree which does not expose the fluid to the person applying the same to the tree, the fluid being completely sealed within a container and allowed to drip therefrom directly into the sap stream without contacting or contaminating such person.

A further object of the present invention is to provide a method of injecting a fluid into a tree which does not significantly damage the tree and in which the quantity of fluid injected can be readily controlled in accordance with the type and size of the tree and the nature of the particular fluid.

In one aspect thereof, the method of injecting a fluid into a tree in accordance with the present invention is characterized by the steps of forming a hole in a tree, inserting a container carrying the fluid into the hole so that the container is substantially confined within the tree, and providing an opening through a confined portion of the container to permit the fluid to communicate from the container into the tree.

Figure 2:
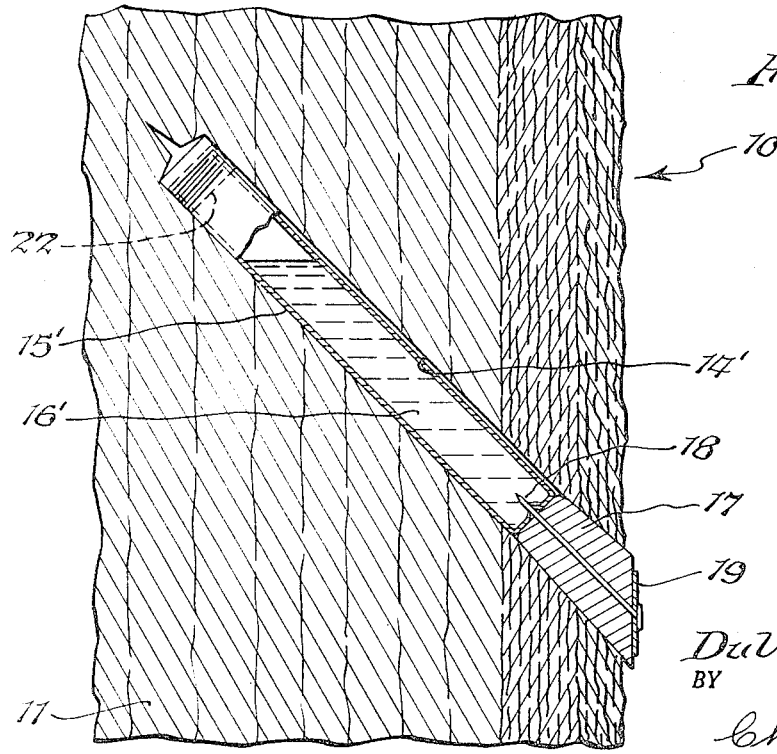

Various other novel features inherent in the method of tree treatment of the present invention are pointed out in detail in conjunction with the following description of two illustrative embodiments thereof considered in conjunction with the accompanying drawing depicting the same wherein like numerals denote like parts throughout and wherein:

FIG. 1 is a fragmentary vertical cross sectional view of a tree with an apparatus for injecting fluid shown in operable position therein; and FIG. 2 is a corresponding fragmentary vertical cross sectional view of a tree with another form of injection apparatus shown therein.

Referring now to the drawing there is shown, in both figures, a tree trunk generally designated 10 comprising the usual bark 13, sapwood 12 and non-active heartwood 11. In carrying out the method of this invention, an upwardly inclined hole 14 is bored through the bark 13 and sapwood 12 and into the heartwood 11 by a suitable drill, not shown, and forms a recess for confining a container 15 carrying a liquid fluid 16 wholly within the lateral confines of the tree, as shown in FIG. 1. Fluid 16 can be a nutrient or a medicament or any other fluid provided for a particular purpose.

Container 15 comprises a cylinder or tube which, in the embodiment shown in FIG. 1, is closed at both ends. Container 15 can be formed of any suitable thin walled material such as sheet metal, but, in the preferred form, comprises a clear, rigid, plastic material which is easily punctured and wherein the amount of fluid may be readily determined by visual inspection. A tapered plug 17 of suitable material, such as wood, is provided for placement in the exposed end of hole 14 and has a puncturing implement such as a prong or nail 18 which passes axially therethrough in axial alinement with bore hole 14. The sharpened end of nail or prong 18 projects inwardly from the inner face of plug 17 for puncturing the lower end of container 16 when in use. Plug 17 is frusto-conically shaped with the larger base thereof angularly cut to provide a flat outer face vertically substantially flush with the surface of bark 13. The opposite sides of the plug adjacent the outer face project outwardly beyond the curved bark 13 of the tree to provide gripping surfaces facilitating insertion and removal of plug 17. A diametrically reduced aluminum disc 19 is secured on the outer face of plug 17 by suitable means and can be secured between the head of nail 18 and the outer face of plug 17. Disc 19 can bear appropriate indicia as to the type and date of treatment as well as indicating the location of the injection apparatus in the tree.

To insure proper flow of fluid through the punctured lower end of container 15 when in use, the upper end also can be opened to prevent the formation of a vacuum in the container as fluid 16 drips from container 15. In the form shown in FIG. 1, this is accomplished by a cylindrical plug 20 having an axially projecting puncturing prong or nail 21 secured thereto inserted into the upper end of bore hole 14 prior to insertion of container 15, the prong or nail 21 being axially alined therewith and projecting toward the lower end of the bore hole. Hole 14, in this form, extends axially sufficiently to receive plug 20, container 15, and plug 17 in operative arrangement with the nails of both plugs puncturing or engaging through opposite ends of container 15 and with plug 17 lying in the open end of the bore hole centrally flush with the external surface of bark 11 and retaining container 15 within bore hole 14.

In the form illustrated in FIG. 2, a container 15' is inserted in an inclined bore hole 14', the container having a threaded cap 22, indicated by broken lines in FIG. 2, which is removed prior to insertion of container 15' into hole 14'. The length of the bore hole 14' required in the latter form is somewhat smaller than bore hole 14 and the same plug 17 and nail 18 as in the previous form can be used here to puncture the lower end of container 15'. In both forms, air is allowed to leak past plug 17 by virtue of the wood texture, notwithstanding the tight fit of the plug, and between the container walls and the bore hole to prevent formation of a vacuum in the container.

In practicing the method of the present invention the tree requiring treatment is bored upwardly and inwardly toward the center thereof by a drill at a selected spot in the surface of the tree sufficiently to accommodate the overall length of cylinder 15 and plugs 17 and 20 or sufficiently to accommodate the length of container 15' and plug 17 if the capped container of FIG. 2 is utilized. In the form shown in FIG. 1, plug 20 is inserted by an appropriate tool, not shown, into bore hole 14 for disposition in the upper end thereof with the prong or nail 21 projecting axially of bore hole 14 toward its open end. Container 15 is next inserted into hole 14 and urged upwardly so that the upper end thereof is punctured by the prong or nail 21. In the form illustrated in FIG. 2, cap 22 is first removed, and container 15' is then inserted into the bore hole. In both forms, plug 17 is then inserted into the bore hole opening and pressed home so that prong or nail 18 punctures and opens the lower end of the container allowing fluid 16 to flow or drip therefrom into sapwood 12. Plug 17 frictionally engages the walls of hole 14 sufficiently to prevent the container from sliding out of the hole and to confine the treatment fluid within the tree, and lies substantially flush with the bark of the tree to wholly confine the injection apparatus within the tree.

By providing an upwardly inclined bore hole, the treatment fluid is gravity fed through the puncture or opening at the lower end of the container into the tree at a controlled rate depending on the diameter of the nail or prong 18. This configuration positions the point of introduction of the fluid in the circulatory system or sapwood of the tree whereby the fluid circulates through and is assimilated by the tree. Also, the container may be replaced after it is drained by a similar container where further fluid is required, or replaced by a smaller, easily punctured plastic envelope, not shown, containing fluid where smaller quantities are desired, by removing plug 17 and the drained container and inserting the new container as described above.

Having thus described and illustrated two preferred embodiments of my invention, it will be understood that such description and illustration is by way of example only and that such modifications and changes as may suggest themselves to those skilled in the art are intended to fall within the scope of the present invention which is limited only by the scope of the appended claims.

I claim:

1. The method of applying a fluid to a tree comprising forming a hole in the tree, positioning a container carrying the fluid in the hole so that the container is substantially confined within the tree, closing the exterior end of the hole, and providing an opening through a portion of the container to permit the fluid to pass from the container into the tree.

2. The method according to claim 1 wherein the step of forming the hole includes boring into the tree at an upwardly inclined angle to provide an upwardly and inwardly inclined hole.

3. The method according to claim 2 wherein the opening is provided through a confined lower end portion of the container adjacent the sapwood of the tree.

4. The method according to claim 3, wherein positioning the container includes inserting the container into the hole so that the container is wholly confined within the tree.

5. The method according to claim 3, together with the step of providing an opening through the upper end portion of the container.

6. The method according to claim 3, wherein the step of forming an opening through the lower end portion of the container is accomplished by inserting a retaining plug having a puncturing means on its inner end into the bore hole opening and thereby puncturing the lower end of the container.

7. The method according to claim 6 including inserting a puncturing means at the upper end of the bore hole prior to inserting the container therein, and puncturing the upper end of the container by inserting the container into the bore hole and pressing the upper end thereof against the upper end puncturing means.

8. The method according to claim 6 including opening an end of the container prior to insertion into the hole and inserting the container into the hole so that the open end thereof is disposed adjacent the upper end of the hole.

References Cited
UNITED STATES PATENTS

| | | | |
|---|---|---|---|
| 772,776 | 10/1904 | Berger | 47—57.5 |
| 2,970,404 | 2/1961 | Beaufils et al. | 47—57.5 |

FOREIGN PATENTS

| | | |
|---|---|---|
| 891,350 | 12/1943 | France. |

ROBERT E. BAGWILL, *Primary Examiner.*